(12) United States Patent
Rhee

(10) Patent No.: US 6,800,199 B1
(45) Date of Patent: Oct. 5, 2004

(54) WATER PURIFIER

(75) Inventor: Tae Hee Rhee, Na-601 Hwangje Apt., 160-29, Nongokdong, Siheung-si, Kyonggi-do 429-310 (KR)

(73) Assignees: Won Seog Khang, Seoul (KR); Tae Hee Rhee, Kyonggi-do (KR)

( * ) Notice: Subject to any disclaimer, the term of this patent is extended or adjusted under 35 U.S.C. 154(b) by 200 days.

(21) Appl. No.: 10/168,131

(22) PCT Filed: Sep. 19, 2000

(86) PCT No.: PCT/KR00/01049

§ 371 (c)(1),
(2), (4) Date: Jun. 19, 2002

(87) PCT Pub. No.: WO01/83079

PCT Pub. Date: Nov. 8, 2001

(30) Foreign Application Priority Data

Apr. 19, 2000 (KR) ........................................ 2000-20700

(51) Int. Cl.[7] ........................... B01D 27/08; B01D 35/30
(52) U.S. Cl. .................... 210/232; 210/249; 210/257.2; 210/266; 210/282
(58) Field of Search ............................... 210/232, 249, 210/257.2, 266, 282

(56) References Cited

U.S. PATENT DOCUMENTS 5,269,918 A    12/1993    Lapidus et al.
5,397,462 A  * 3/1995    Higashijima et al.
2001/0045386 A1 * 11/2001  Stankowski et al. ........ 210/235

FOREIGN PATENT DOCUMENTS

| JP | 61-086915 |   | 5/1986 |
| JP | 03-123689 | * | 5/1991 |
| JP | 09-117617 |   | 5/1997 |
| KR | 99-0086940 |  | 12/1999 |
| WO | 01/64321  | * | 9/2001 |

* cited by examiner

Primary Examiner—Thomas M. Lithgow
(74) Attorney, Agent, or Firm—Lowe Hauptman Gilman & Berner LLP

(57) ABSTRACT

A water purifier that assures easier change of a used filter comprises a base, at least one filter replaceably attached to the base and including a first end with a first fluid port and a second end with a second fluid port, a first connector supporting the first end of the filter in a separable manner and including a connector port connected to the first fluid port of the filter, a second connector spaced apart from the first connector to accomodate the filter therebetween and including a bore aligned with the second fluid port of the filter, a spool fitted into the bore of the second connector for movement between an extended position allowing fluid flow and a contracted position preventing fluid flow, and a spool actuator for slidingly moving the spool between the extended position and the contracted position.

11 Claims, 5 Drawing Sheets

US 6,800,199 B1

WATER PURIFIER

TECHNICAL FIELD

The present invention is directed to a water purifier that enables a used filter to be replaced with ease.

BACKGROUND ART

Due to water pollution, the tap water supplied to every home or office could hardly be drunk as it is. There is a growing need for a water purifier that can purify polluted water (hereinafter, referred to as "raw water") into clean water suitable for drinking (hereinafter, referred to as "purified water").

A plurality of filters for filtering the raw water are incorporated in such a water purifier and connected in series with each other so that the raw water can consecutively pass through the filters. It is recommended that the filters be periodically replaced depending on the level of pollution of the water or the quantity of water to be filtrated. Used filters have a lower purification capacity and may increase the level of water pollution by way of providing a bacterial habitat. Therefore, the filters installed in the water purifier must be replaced as frequently as possible.

However, the conventional water purifiers pose a problem in that it is difficult and time-consuming to replace polluted filters with new ones. Specifically, the filters employed in the conventional water purifiers are connected with each other by means of separate connecting devices that are threadedly engaged with both inlets and outlets of the filters. Thus, in order to replace the filters of which exchange periods are different from each other, the opposite ends of the connecting devices should first be disconnected one by one from the inlets and outlets of the filters, the polluted filters should be then replaced with new ones, and finally, the opposite ends of the connectors should be threadedly engaged again with the inlets and outlets of the new filters. A further drawback resides in that the used filters have to be replaced under the condition that an inlet passage of the raw water is kept shut off.

For the reasons noted above, individual home user feels it cumbersome to change the filters himself or herself and therefore tends to request a purifier management company to carry out the filter replacement task on a periodic basis. It goes without saying that employing the purifier management company for maintenance purpose is highly costly.

SUMMARY OF THE INVENTION

Accordingly, it is an object of the present invention is to provide a water purifier assuring faster and easier change of a used filter.

Another object of the invention is to provide a water purifier that makes it possible to replace a used filter without having to shut off a raw water inlet port.

In order to achieve the above objects, the present invention provides a water purifier comprising a base plate; at least one filter which is replaceably attached to the base plate and includes a first end with a first fluid port formed therein and a second end with a second fluid port formed therein; a first connector means which supports the first end of the filter to be separable from the first connector means and includes a connector port connected to the first fluid port of the filter; a second connector means which is placed to be spaced apart from the first connector means at a distance sufficient to accommodate the filter therebetween and includes a bore aligned with the second fluid port of the filter; a spool which is fitted into the bore of the second connector means so that the spool can move between an extended position where the spool is connected to the second fluid port of the filter in order to allow fluid communication between the filter and the second connector means and a contracted position where the spool is separated from the second fluid port of the filter in order to interrupt the fluid communication therebetween, and which includes an axial fluid passage; and a spool actuating means for slidingly moving the spool between the extended position and the contracted position.

BEST MODE FOR CARRYING OUT THE INVENTION

A preferred embodiment of the present invention will now be explained in detail with reference to the accompanying drawings.

Figure 1:
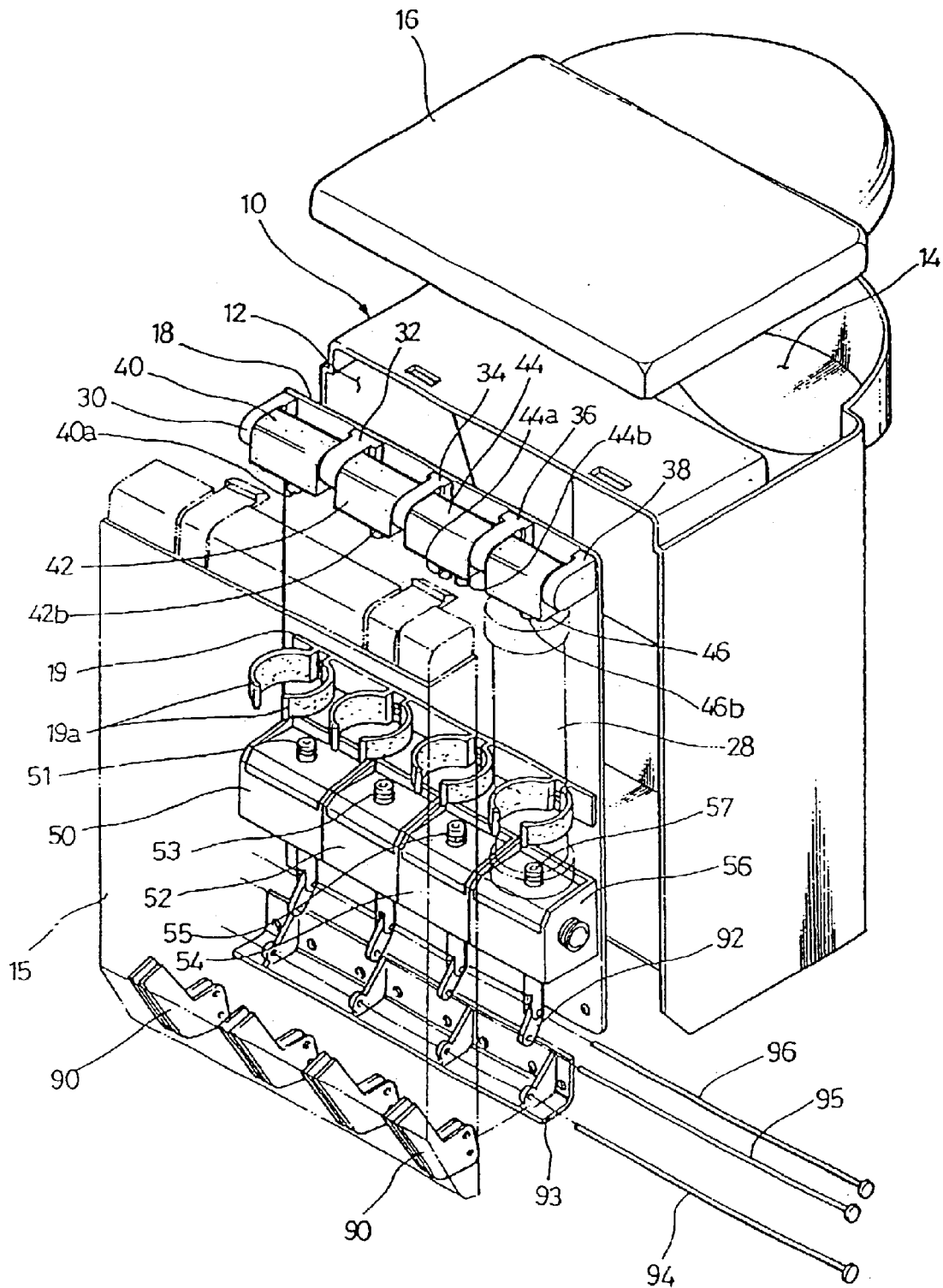
FIG. 1 is an exploded perspective view showing the constitution of a water purifier according to the present invention.
Figure 2:
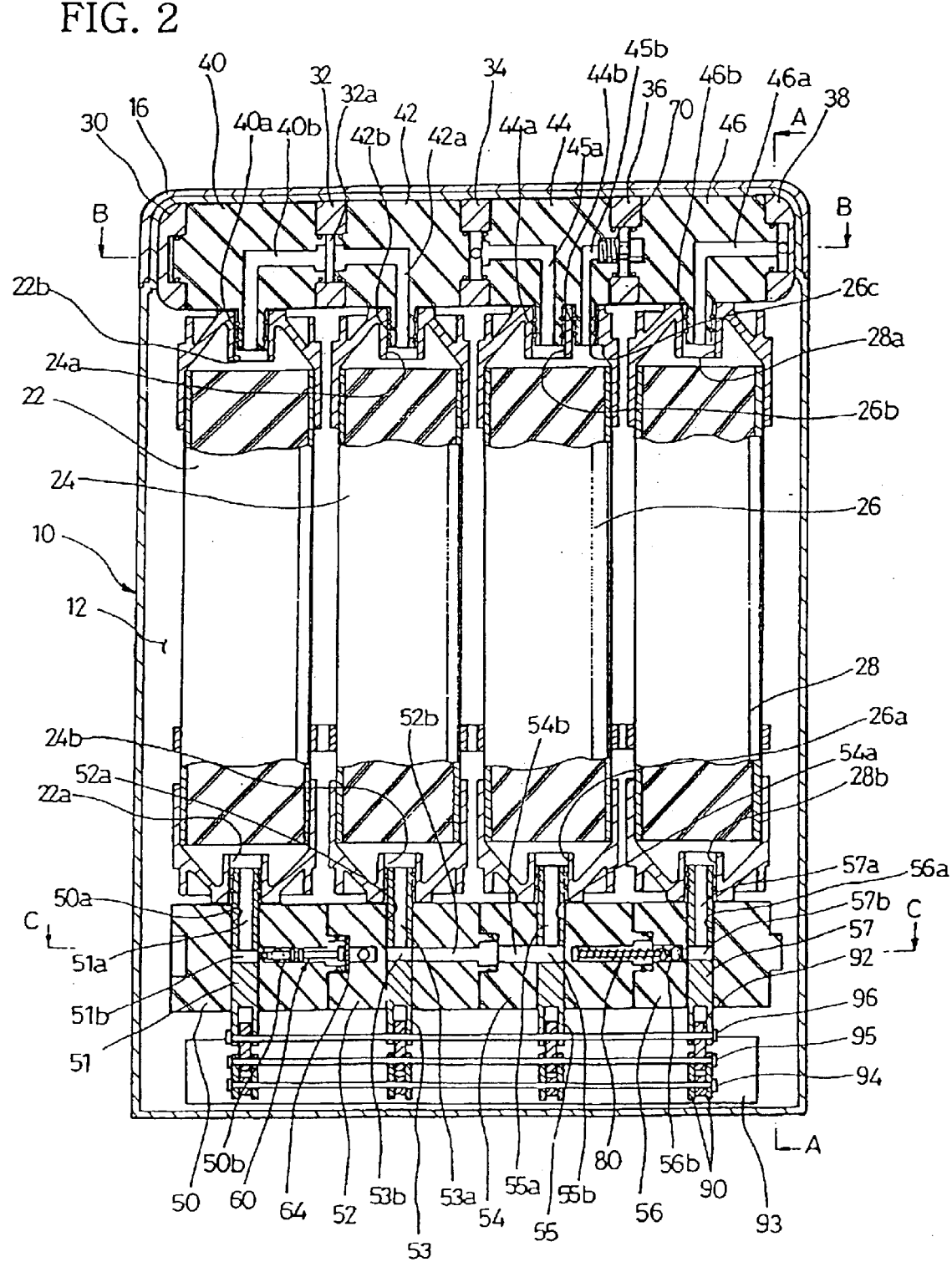
FIG. 2 is a sectional view of the water purifier showing a state where various components of FIG. 1 have been assembled.
Figure 3:
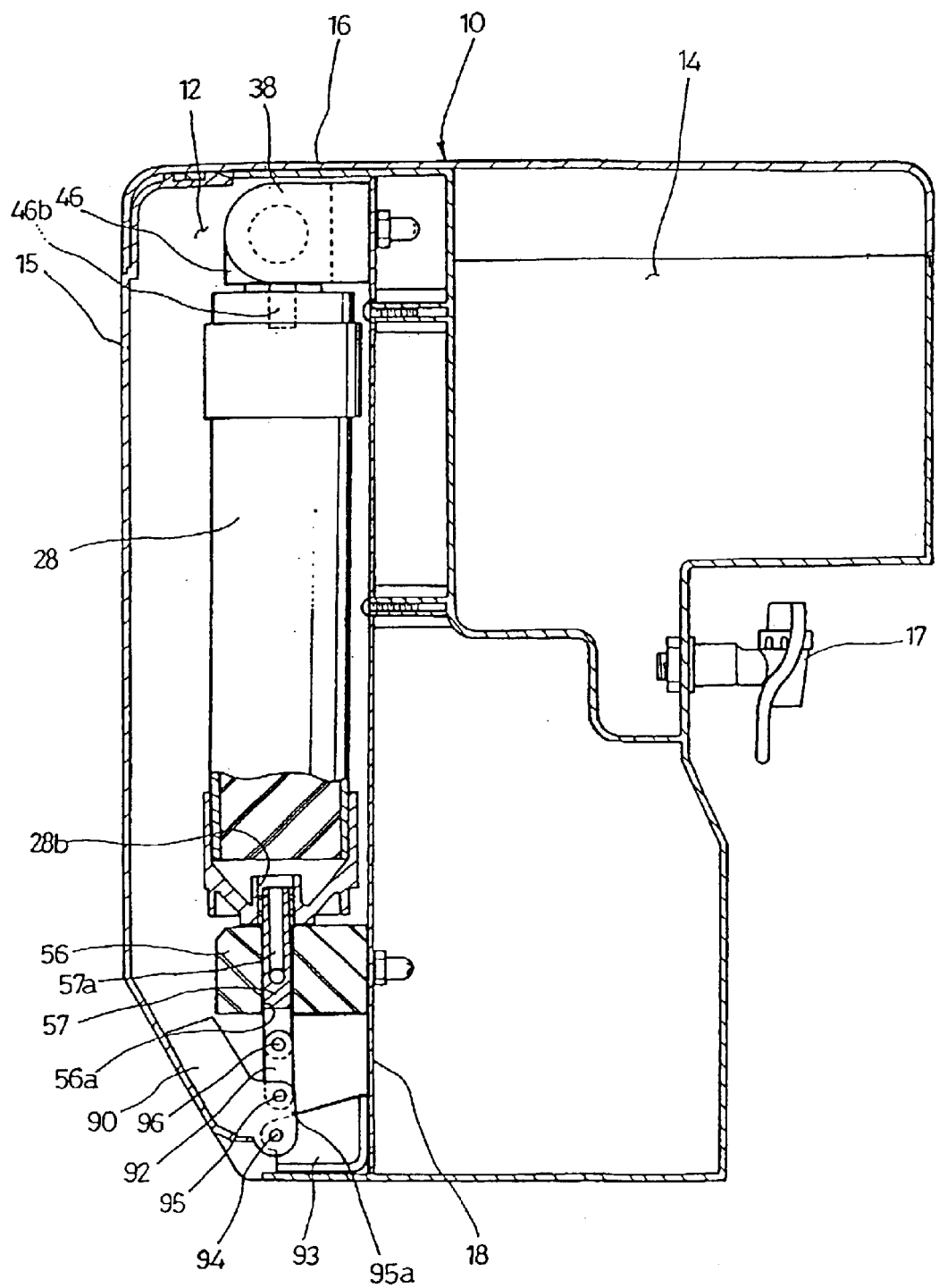
FIG. 3 is a sectional view of the water purifier taken along line A—A in FIG. 2.

Referring first to FIGS. 1 to 3, a water purifier of the present invention comprises a body 10 having a purifying chamber 12 and a water storage tank 14. The purifying chamber 12 in which a plurality of filters are placed is opened or closed by a door 15. Further, the water storage tank 14 in which water purified by the filters is stored is opened or closed by a cover 16. The purified water in the water storage tank 14 can be discharged to the outside through a discharge valve 17 installed at a front face of the body 10.

It can be appreciated that a base plate 18 is installed vertically in the purifying chamber 12, and the plurality of filters 22, 24, 26 and 28 are detachably placed in the base plate 18. More specifically, first and second connector means are placed on upper and lower portions of the base plate 18, respectively. The first and second connector means separably support both ends of the filters 22, 24, 26 and 28 while consecutively connecting the filters 22, 24, 26 and 28 with each other so that the raw water supplied from the outside of the water purifier can pass through the filters in sequence.

The first connector means comprises first, second, third, fourth and fifth brackets 30, 32, 34, 36 and 38 which are installed at the upper portion of the base plate 18 and spaced apart from each other in a horizontal direction, and first, second, third and fourth upper connectors 40, 42, 44 and 44 which are installed between the brackets 30, 32, 34, 36 and 38 so that the upper connectors can rotate about a pivot axis thereof. In addition, the second connector means comprises first, second, third and fourth lower connectors 50, 52, 54 and 56 which are fixedly installed at the lower portion of the base plate 18.

The upper connectors 40, 42, 44 and 46 of the first connector means and the lower connectors 50, 52, 54 and 56 of the second connector means are disposed to face with each other, and the respective sets of the upper connectors 40,.42, 44 and 46 and the lower connectors 50, 52, 54 and 56 facing with each other support the both ends of the respective filters 22, 24, 26 and 28 and make the raw water circulate through the filters 22, 24, 26 and 28 in sequence.

Hereinafter, the respective sets of the upper connectors 40, 42, 44 and 46 and the lower connectors 50, 52, 54 and 56 will be described in detail. (For the sake of convenience, the first upper connector 40 and the first lower connector 50 are referred to as a first set of the upper and lower connectors, the second upper connector 42 and the second lower connector 52 are referred to as a second set of the upper and lower connectors, the third upper connector 44 and the third lower connector 54 are referred to as a third set of the upper and lower connectors, and the fourth upper connector 46 and the fourth lower connector 56 are referred to as a fourth set of the upper and lower connectors.)

Figure 5:
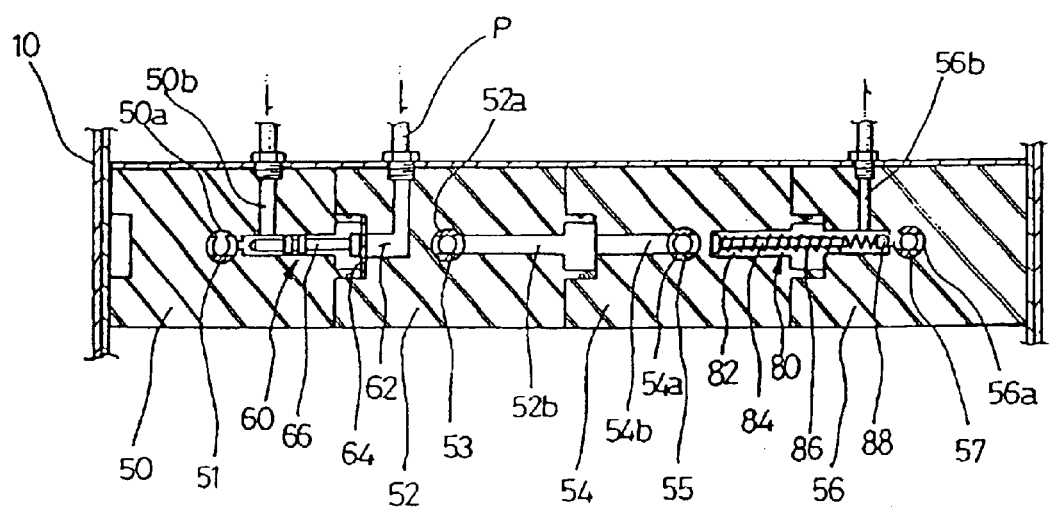

Referring to FIGS. 2 and 5, the first set of the first upper and lower connectors 40, 50 supports upper and lower portions of the first filter 22 serving as a sediment filter. The first lower connector 50 includes a vertical bore 50a with both ends thereof opened and a feed passage 50b for feeding the external raw water into the water purifier. The feed passage 50b and the bore 50a are constructed to communicate with each other. Further, a spool 51 is inserted into the bore 50a and constructed to vertically reciprocate between an upper "extended position" and a lower "contracted position." The spool 51 is also constructed such that a lower portion thereof protrudes beyond a lower face of the first lower connector 50. Especially, the spool is constructed such that an upper portion thereof protrudes beyond an upper face of the first lower connector 50 as the spool moves to the "extended position." Consequently, the spool is inserted into and coupled with a second fluid port 22a of the first filter 22. Furthermore, a vertical fluid passage 51a and a horizontal fluid passage 51b communicating with each other are formed in the spool 51. The horizontal fluid passage 51b is constructed to communicate with the feed passage 50b when the spool 51 rises to reach its uppermost end position, and the raw water to be fed into the feed passage 50b is conveyed to the first filter 22. Here, a plurality of rubber rings R are disposed on an outer peripheral surface of the spool 51. Further, the rubber rings R come into close contact with an inner surface of the bore 50a so as to prevent the raw water flowing along the feed passage 50b, the horizontal fluid passage 51b and the vertical fluid passage 51a from being leaked to the outside.

The first upper connector 40 includes a connector port 40a inserted into and coupled with the first fluid port 22b of the first filter 22, and a drain passage 40b communicating with the connector port 40a. The raw water discharged from the first filter 22 can be conveyed to the second upper connector 42 through the connector port 40a and the drain passage 40b.

The second set of the second upper and lower connectors 42, 52 supports upper and lower portions of the second filter 24 serving as a pre-carbon filter. An inlet passage 42a, which communicates with a drain passage 40b of the first upper connector 40, formed in the second upper connector 42. Here, a through-hole 32a through which the drain passage 40b of the first upper connector 40 and the inlet passage 42a of the second upper connector 42 communicate with each other is formed in the second bracket 32 by which a side of each of the first and second upper connectors 40, 42 is supported. Further, a connector port 42b inserted into and coupled with an inlet 24a of the second filter 24 is formed in the second upper connector 42. The second upper connector 42 causes the raw water, which is discharged from the first upper connector 40 through the inlet passage 42a and the connector port 42b, to be fed into the second filter 24.

The second lower connector 52 includes a vertical bore 52a with both ends thereof opened and a drain passage 52b communicating with the bore 52a. The drain passage 52b and the bore 52a are constructed to communicate with each other. Further, a spool 53 is inserted into the bore 52a so that the spool can reciprocate vertically in the bore. The spool 53 is constructed to reciprocate vertically between an upper "extended position" and a lower "contracted position." The spool 53 is also constructed such that a lower portion thereof protrudes beyond a lower face of the second lower connector 52. In particular, the spool is constructed such that an upper portion thereof protrudes beyond an upper face of the second lower connector 52 as the spool moves to the "extended position." Consequently, the spool is inserted into and coupled with a second fluid port 24b of the second filter 24. Furthermore, a vertical fluid passage 53a and a horizontal fluid passage 53b communicating with each other are formed in the spool 53. The horizontal fluid passage 53b is constructed to communicate with the drain passage 52b when the spool 53 rises to reach its uppermost end position, and the raw water discharged from the second filter 24 is conveyed to the third lower connector 54.

In the meantime, a valve for shutting off the raw water is installed between the first and second lower connectors 50, 52. As shown in FIG. 5, the valve 60 for shutting off the raw water has a function of sensing a rapid pressure difference in a conveying line of the raw water generated due to the opening and closing of the discharge valve 17 installed in the body 10 and beforehand preventing the external raw water from flowing into the first filter 22. In order to perform the function, a pressure chamber 62 is formed in the second lower connector 52 so that a purified water in a pilot line P branched off from a final discharge line of the purified water is prepared therein. Further, a diaphragm 64, which moves from side to side according to a pressure difference in the purified water fed from the pilot line P, is installed on a side of the pressure chamber 62; and an actuating rod 66, which opens and closes the raw water feed passage 50b of the first lower connector 50 by moving from side to side by means of the diaphragm 64, is installed in the first lower connector 50. The valve 60 for shutting off the raw water can prevent beforehand a leakage from joint portions and damage of the components occurring due to the rapid pressure difference in the purified water.

Next, the third set of the third upper and lower connectors 44, 54 supports upper and lower portions of the third filter 26 serving as a reverse osmosis filter. The third lower connector 54 includes a vertical bore 54a with both ends thereof opened and a feed passage 54b communicating with the drain passage 52b of the second lower connector 52. The feed passage 54b and the bore 54a are constructed to communicate with each other. Further, a spool 55 is inserted into the bore 54a so that the spool can move vertically therein. The spool 55 is constructed such that it can reciprocate vertically between an upper "extended position" and a lower "contracted position." The spool 55 is also constructed such that a lower portion thereof protrudes beyond a lower face of the third lower connector 54. Especially, the spool is constructed such that an upper portion thereof protrudes beyond an upper face of the third lower connector 54 as the spool moves to the "extended position." Consequently, the spool is inserted into and coupled with a second fluid port 26a of the third filter 26. Furthermore, a vertical fluid passage 55a and a horizontal fluid passage 55b communicating with each other are formed in the spool 55. The horizontal fluid passage 55b is constructed to communicate with the feed passage 54b when the spool 55 rises to reach its uppermost end position, and the raw water fed into the feed passage 54b is conveyed to the first filter 22 through the horizontal fluid passage 55b.

Figure 4:
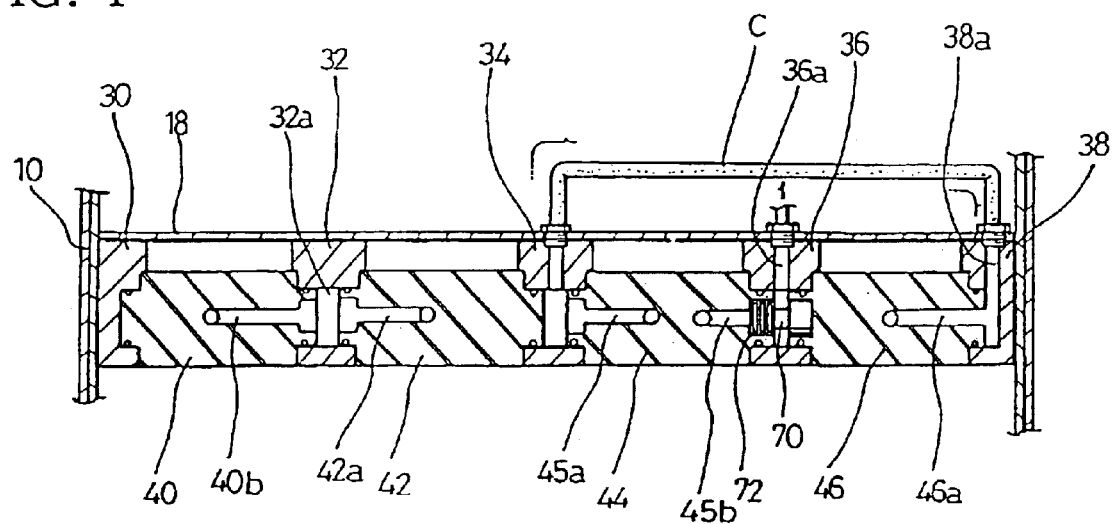
FIGS. 4 and 5 are sectional views of the water purifier taken along lines B—B and C—C in FIG. 2, respectively.

The third upper connector 44 includes first and second connector ports 44a, 44b which are inserted into and coupled with the first and third fluid ports 26b, 26c of the third filter 26, respectively, and drain passages 45a, 45b which communicate with the first and second connector ports 44a, 44b, respectively. The first connector port 44a and the first drain passage 45a are used to convey the raw water discharged from the first fluid port 26b of the third filter 26 to the fourth upper connector 46, and the second connector port 44b and the second drain passage 45b are used to convey the raw water discharged from the third fluid port 26c of the third filter 26 to the outside through a drain passage 36a of the fourth bracket 36. For reference, in order to extend life of a reverse osmosis membrane, a predetermined quantity of discharge water should be incessantly discharged to the outside according to the reverse osmosis type method of purifying the water. Therefore, the third fluid port 26c is formed so that a predetermined quantity of the raw water can be discharged to the outside through the third filter 26. Furthermore, as shown in FIG. 4, a flow rate of the discharge water from the third fluid port 26c of the third filter 26 was kept constant by placing an orifice block 70 in the second drain passage 45b. The orifice block 70 is cylindrical, and helical orifice grooves 72 are formed in a peripheral surface of the orifice block.

Finally, the fourth set of the fourth upper and lower connectors 46, 56 supports upper and lower portions of the fourth filter 28 serving as a post-carbon filter. In the fourth upper connector 46 is formed an inlet passage 46a which communicates with the first drain passage 45a of the third upper connector 44. Here, as shown in FIG. 4, a connecting passage 38a, which communicates with the first drain passage 45a of the third upper connector 44 through a connecting tube C, is formed in the fifth bracket 38 by which a side of the fourth upper connector 46 is supported. The connecting passage 38a is also constructed to communicate with the inlet passage 46a of the fourth connector 46. Further, as shown in FIG. 2, a connector port 46b, which is inserted into and coupled with the first port 28a of the fourth filter 28, is formed in the fourth upper connector 46. The raw water discharged from the third upper connector 44 through the inlet passage 46a and the connector port 46b is fed into the fourth filter 28 through the fourth upper connector 46.

The fourth lower connector 56 includes a vertical bore 56a with both ends thereof opened and a drain passage 56b communicating with the bore 56a. The drain passage 56b and the bore 56a are constructed to communicate with each other. Further, the purified water purified through the plurality of the filters is discharged into the water tank 14 in the body 10. A spool 57 is inserted into the bore 56a so as to reciprocate vertically therein. The spool 57 is constructed such that it can reciprocate vertically between an upper "extended poison" and a lower "contracted position." The spool 57 is constructed in such a manner that a lower portion thereof can protrude beyond a lower face of the fourth lower connector 56. Especially, the spool 57 is constructed in such a manner that an upper portion thereof can protrude beyond an upper face of the fourth lower connector 56 as it moves to the "extended position," and consequently, it is inserted into and coupled with a second fluid port 28a of the fourth filter 28. Furthermore, a vertical fluid passage 57a and a horizontal fluid passage 57b communicating with each other are formed in the spool 57. The horizontal fluid passage 57b is constructed to lo communicate with the feed passage 56b of the fourth lower connector 56 when the spool 57 rises to reach its uppermost end position, and the purified water discharged from the fourth filter 28 is discharged through the horizontal fluid passage to the water tank 14 in the body 10.

In addition, as shown in FIG. 5, a check valve 80 is installed in the fourth lower connector 56. The check valve 80 prevents the purified water discharged through the drain passage 56b into the water tank 14 from flowing backward and being fed into the fourth lower connector 56. To this end, on a side of the third lower connector 54 is formed an operating chamber 82 in which a guide rod 84 and a compression spring 86 supported at an end of the guide rod 84 are in turn placed; and a ball 88, which is urged by the compression spring 86 in a direction opposite to a flow direction of the purified water so as to shut off the drain passage 56b, is installed in the fourth lower connector 56.

Therefore, by the upper connectors 40, 42, 44 and 46 and the lower connectors 50, 52, 54 and 56 having the above constitutions, the plurality of the filters 22, 24, 26 and 28 can be connected in parallel with each other such that the raw water fed from the outside can pass through the filters one after another. In particular, the plurality of the filters 22, 24, 26 and 28 can be consecutively connected with each other without using an additional connecting means. Accordingly, the raw water fed from the outside can be purified into the clean purified water while passing through the filters 22, 24, 26 and 28 connected consecutively with each other.

In addition, a holder 19 for fixing each of the filters 22, 24, 26 and 28 is installed on the base plate 18, and includes a pair of opposite fingers 19a for wrapping around each of external surfaces of the filters 22, 24, 26 and 28. The fingers 19a can be deformed elastically, and multiple pairs of the fingers can be formed according to the numbers of the filters 22, 24, 26 and 28.

Referring again to FIGS. 1 and 3, a spool actuating means for causing the spools 51 53, 55 and 57, which are installed in the first, second, third and fourth lower connectors 50, 52, 54 and 56, respectively, to move vertically to the "extended position" and the "contracted position" is installed in a lower end of the base plate 18. The spool actuating means comprises a plurality of actuating levers 90 pivotally hinge-connected to the lower end of the base plate 18, and a plurality of links 92 of which the first ends are hinge-connected through joints 95a to the actuating levers 90, respectively, and of which the second ends are hinge-connected to lower ends of the spools 51, 53, 55 and 57, respectively.

The actuating levers 90 arc installed pivotally on a hinge shaft 94 of a hinge plate 93 assembled to the lower end of the base plate 18. The first ends of the links 92 are hinge-connected to a pivot shaft 95 of the joint 95a, whereas the second ends of the links 92 are pivotally hinge-connected to a rotating shaft 96 in the lower ends of the spools 51, 53, 55 and 57. Furthermore, the hinge shaft 94 should be placed right below the rotating shaft 96, and the pivot shaft 95 should be placed between the hinge shaft 94 and the rotating shaft 96. According to the above constitution, the hinge shaft 94 gets near to the rotating shaft 96 by means of the links 92, as the actuating levers 90 rotate. Consequently, the spools 51, 53, 55 and 57 are lowered.

The spool actuating means causes the spools 51, 53, 55 and 57 to be either separated from or to engaged with the second ports of the filters 22, 24, 26 and 28, respectively, by moving the spools 51, 53, 55 and 57 between the "extended position" and the "contracted position." Thus, the spools 51, 53, 55 and 57 can be easily replaced. In particular, the spool actuating means can shut off the horizontal fluid passages 51b, 53b, 55b and 57b of the spools 51, 53, 55 and 57 and the inlet or drain passages of the lower connectors 50, 52, 54 and 56 from each other while separating the spools 51, 53, 55 and 57 from the second fluid ports of the filters 22, 24, 26 and 28 by lowering the spools 51, 53, 55 and 57. Consequently, a function of shutting off the raw water required when the filters 22, 24, 26 and 28 are replaced can be simultaneously performed.

In the meantime, it has been described in the embodiment of the present invention that the actuating levers 90 are integrally formed with the door 15. According to the constitution, when the door 15 has been opened, the spools 51, 53, 55 and 57 can be simultaneously separated from or engaged with the second fluid ports of the filters. The actuating levers 90 and the door 15 may, of course, be separately formed.

Figure 6:
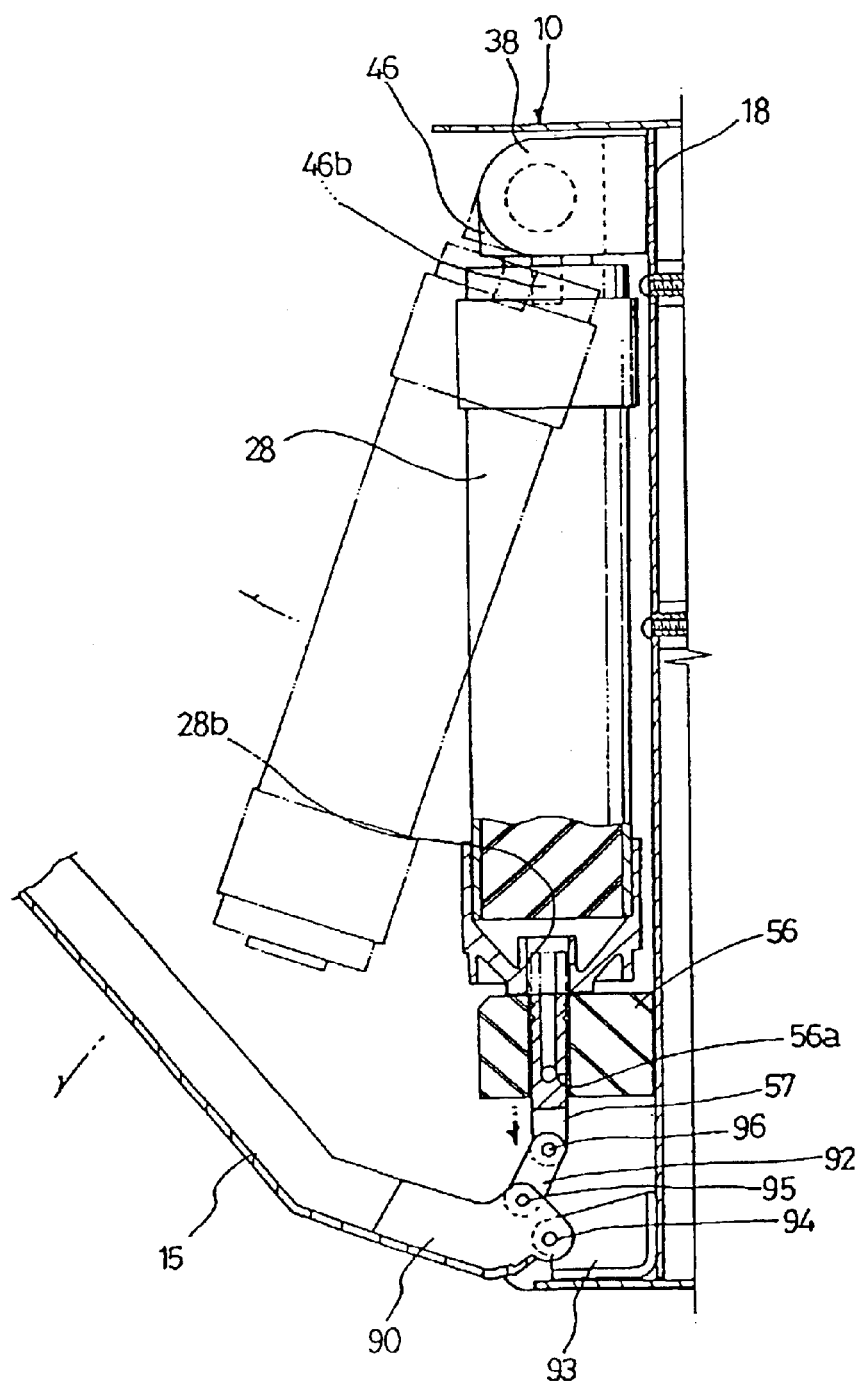
FIG. 6 is a schematic view illustrating an operation of a spool actuating means that is a main component of the present invention.

As described above, thank to the provision of the first and second connector means, it becomes possible to dispose the filters 22, 24, 26 and 28 in series with each other on a single plane without having to use any additional connecting device. Moreover, as shown in FIG. 6, a lower portion of the filter 28 can be unfixed by separating the spool 57 from the bottom surface of the filter 28 after the door 15 has been rotated or opened, and then, an upper portion of the filter 28 can also be unfixed by separating the filter 28 from the connector port 46b of the upper connector 46 after the filter 28 has been rotated about the upper connector 46. Therefore, the filter 28 can be easily separated from both the upper and lower connectors 46, 56. Of course, the, filter 28 can be installed between the upper and lower connectors 46, 56 by simply performing the aforementioned operation in reverse order. Consequently, since the upper and lower portions of the filters are unfixed by means of the spool actuating means, the filters can be easily replaced.

Although the present invention has been described in detail with respect to the preferred embodiment of the invention, it should be understood that a person having an ordinary skill in the art to which the present invention pertains, can make various modifications and changes to the present invention without departing from the spirit and scope of the invention defined by the appended claims. Therefore, the present invention is not limited to the preferred embodiment of the present invention, but it should be understood that the various modifications to the present invention fall within the scope of the invention.

Industrial Applicability

According to the water purifier of the present invention as described above, a plurality of filters can be disposed in series in a coplanar fashion by use of first and second connector means. In particular, there is an advantage over the prior art in that the filters can be replaced with extreme ease. This is mainly because the spools provided in the second connector means can be selectively separated from or lo engaged with the second fluid ports of the filters through the use of the spool actuating means. In addition, the inlet passage for introduction of the raw water need not be shut off through separate operation during the process of filter replacement, since the inlet passage is automatically closed off as the spools moves into the contracted position.

What is claimed is:

1. A water purifier, comprising:

a base plate;

at least one filter replaceably attached to said base plate and including a first end with a first fluid port and a second end with a second fluid port;

a first connector means separably supporting the first end of said filter and having a connector port connected to the first fluid port of said filter;

a second connector means spaced apart from said firs connector means at a distance sufficient to accommodate said filter therebetween and having a bore aligned with the second fluid port of said filter;

a spool fitted into the bore of said second connector means for movement between an extended position wherein said spool is connected to the second fluid port of said filter to allow fluid communication between said filter and said second connector means and a contracted position wherein said spool is separated from the second fluid port of said filter to interrupt the fluid communication therebetween, said spool having an axial fluid passage; and a spool actuator means for slidingly moving said spool between said extended position and said contracted position.

2. The water purifier as recited in claim 1, wherein said first connector means comprises a rotary connector mounted to said base plate for rotation about a pivot shaft between a filter service position and a filter replacement position and wherein said second connector means comprises a fixed connector fixedly attached to said base plate.

3. The water purifier as recited in claim 2, wherein said rotary connector is provided in an upper portion of said base plate, said fixed connector is positioned in a lower portion of said base plate, and said filter is placed between said rotary and said fixed connectors.

4. The water purifier as recited in claim 1, wherein said spool actuator means includes an actuating lever mounted to said base plate so that said actuating lever can rotate about a hinge shaft, a link having one end connected to said spool and the other end connected to said actuating lever through a joint, and a door fixedly attached to said actuating lever.

5. The water purifier as recited in claim 3, wherein said fixed connector includes a feed passage through which raw water is fed and a drain passage through which purified water is discharged.

6. The water purifier as recited in claim 5, wherein said filter comprises first to fourth cylindrical filters, each cylindrical filter having an upper fluid port and a lower fluid port; said lower fluid port of said first filter is connected with said feed passage of said fixed connector; said upper fluid ports of said first and second filters communicate with each other through said rotary connector; said lower fluid ports of said second and third filters communicate with each other through said fixed connector; said upper fluid ports of said third and fourth filters communicate with each other through said rotary connector; and said lower fluid port of said fourth filter is connected with said drain passage of said fixed connector.

7. The water purifier as recited in claim 1, further comprising a filter holder for affixing said filter to said base plate.

8. The water purifier as recited in claim 3, wherein said rotary connector comprises a plurality of independently rotatable unit connectors.

9. The water purifier as recited in claim 1, wherein said spool is so constructed as to prevent water leakage out of said second connector means while said spool is in said contracted position.

10. The water purifier as recited in claim 6, wherein said first filter is a sediment filter, said second filter is a pre-carbon filter, said third filter is a reverse osmosis filter, and said fourth filter is a post-carbon filter.

11. The water purifier as recited in claim 10, further comprising a water tank for storing said purifier water discharged through said drain passage of said fixed connector.

* * * * *